(12) United States Patent
Ganem

(10) Patent No.: US 8,484,712 B2
(45) Date of Patent: Jul. 9, 2013

(54) PERSONAL TOKEN HAVING ENHANCED SIGNALING ABILITIES

(75) Inventor: Herve Ganem, Meudon (FR)

(73) Assignee: Gemalto SA, Meudon Cedex (FR)

( * ) Notice: Subject to any disclaimer, the term of this patent is extended or adjusted under 35 U.S.C. 154(b) by 307 days.

(21) Appl. No.: 12/303,656

(22) PCT Filed: Jun. 8, 2007

(86) PCT No.: PCT/IB2007/001556
§ 371 (c)(1),
(2), (4) Date: Dec. 15, 2010

(87) PCT Pub. No.: WO2007/144737
PCT Pub. Date: Dec. 21, 2007

(65) Prior Publication Data
US 2011/0113479 A1    May 12, 2011

(30) Foreign Application Priority Data

Jun. 9, 2006 (EP) .................................... 06300575
Sep. 20, 2006 (EP) .................................... 06291477

(51) Int. Cl.
*H04L 29/06* (2006.01)
*G06F 15/16* (2006.01)

(52) U.S. Cl.
USPC .................. 726/9; 726/14; 709/217; 709/227

(58) Field of Classification Search
None
See application file for complete search history.

(56) References Cited

U.S. PATENT DOCUMENTS

| 6,151,619 | A  | * | 11/2000 | Riddle | 709/204 |
|-----------|----|----|---------|--------|---------|
| 6,250,557 | B1 | * | 6/2001  | Forslund et al. | 235/492 |
| 7,246,236 | B2 | * | 7/2007  | Stirbu | 713/168 |
| 7,428,606 | B2 | * | 9/2008  | Liu et al. | 710/62 |
| 7,454,233 | B2 | * | 11/2008 | Lu et al. | 455/558 |
| 7,545,868 | B2 | * | 6/2009  | Kennedy et al. | 375/259 |
| 7,609,700 | B1 | * | 10/2009 | Ying et al. | 370/395.21 |
| 7,647,493 | B2 | * | 1/2010  | Bajko et al. | 713/152 |
| 7,669,773 | B2 | * | 3/2010  | Nishizawa et al. | 235/492 |
| 7,877,787 | B2 | * | 1/2011  | Laitinen et al. | 726/4 |
| 7,922,091 | B2 | * | 4/2011  | Deprun et al. | 235/492 |

(Continued)

FOREIGN PATENT DOCUMENTS

EP    1 610 521 A1    12/2005
WO    2004/054302 A    6/2004

(Continued)

OTHER PUBLICATIONS

"USB/IP—a Peripheral Bus Extension for Device Sharing over IP Network", Takahiro Hirofuchi, Eiji Kawai, Kazutoshi Fujikawa, Hideki Sunahara, Nara Institute of Science and Technology, Ikomo, Japan, Freenix Track: 2005 USENIX Annual Technical Conference.*

(Continued)

*Primary Examiner* — Christopher Revak
(74) *Attorney, Agent, or Firm* — Osha • Liang LLP (57) ABSTRACT

The invention relates to a personal token including a microprocessor and a memory, said personal token storing and running a software entity which constitutes an end-point for communication over the internet. The software entity constitutes an end-point according to a signaling protocol over the internet and the signaling protocol is of the type intended when the session for real-time conferencing is initiated between end-points.

10 Claims, 3 Drawing Sheets

U.S. PATENT DOCUMENTS

| | | | | |
|---|---|---|---|---|
| 7,933,591 B2 * | 4/2011 | Blom et al. | | 455/419 |
| 7,944,978 B2 * | 5/2011 | Kennedy et al. | | 375/257 |
| 7,961,705 B2 * | 6/2011 | Kennedy et al. | | 370/349 |
| 7,983,349 B2 * | 7/2011 | Kennedy et al. | | 375/259 |
| 7,983,418 B2 * | 7/2011 | Oyama et al. | | 380/248 |
| 7,986,969 B2 * | 7/2011 | Gaillard et al. | | 455/558 |
| 8,078,733 B2 * | 12/2011 | Åstrom et al. | | 709/227 |
| 8,160,578 B2 * | 4/2012 | Lindgren | | 455/432.2 |
| 8,195,155 B2 * | 6/2012 | Terrill et al. | | 455/433 |
| 8,285,983 B2 * | 10/2012 | Hallenstal et al. | | 713/151 |
| 8,345,778 B2 * | 1/2013 | Kennedy et al. | | 375/257 |
| 2005/0021875 A1 * | 1/2005 | Bouthemy et al. | | 709/250 |
| 2005/0033697 A1 * | 2/2005 | Mundell et al. | | 705/51 |
| 2005/0091376 A1 * | 4/2005 | Helfman | | 709/226 |
| 2005/0141456 A1 * | 6/2005 | Shaheen | | 370/331 |
| 2006/0101116 A1 * | 5/2006 | Rittman et al. | | 709/204 |
| 2006/0154695 A1 * | 7/2006 | Ishibashi | | 455/558 |
| 2006/0293030 A1 * | 12/2006 | Cantini et al. | | 455/411 |
| 2007/0005602 A1 * | 1/2007 | Campadello | | 707/10 |
| 2007/0094691 A1 * | 4/2007 | Gazdzinski | | 725/62 |
| 2007/0157022 A1 * | 7/2007 | Blom et al. | | 713/166 |
| 2008/0075102 A1 * | 3/2008 | Madsen et al. | | 370/419 |
| 2008/0109331 A1 * | 5/2008 | Stadelmann et al. | | 705/34 |
| 2009/0172210 A1 * | 7/2009 | Kesselman et al. | | 710/16 |
| 2009/0215431 A1 * | 8/2009 | Koraichi | | 455/411 |
| 2010/0319017 A1 * | 12/2010 | Cook | | 725/31 |
| 2011/0131419 A1 * | 6/2011 | Dowds et al. | | 713/189 |
| 2011/0153695 A1 * | 6/2011 | Kang et al. | | 707/827 |
| 2011/0214176 A1 * | 9/2011 | Burch et al. | | 726/15 |
| 2012/0066412 A1 * | 3/2012 | Chang et al. | | 710/5 |

FOREIGN PATENT DOCUMENTS

| | | |
|---|---|---|
| WO | 2004/107250 A | 12/2004 |
| WO | 2005/029890 A | 3/2005 |
| WO | 2005/083546 A | 9/2005 |

OTHER PUBLICATIONS

International Search Report from PCT/IB2007/001556 dated Dec. 27, 2007 (3 pages).

* cited by examiner

PERSONAL TOKEN HAVING ENHANCED SIGNALING ABILITIES

FIELD OF THE INVENTION

The invention relates to personal tokens used for authenticating a user when such user accesses to a limited or a private resources equipment such as a mobile telecommunication network, or such as a remote server over the internet.

BACKGROUND

The mostly known device of this type is the IC card such as for example a SIM card (Subscriber Identification Module) or a credit card, but it can also be a USB—Universal Serial Bus—key, a mass memory card, or any kind of token carrying some necessary credentials.

Such tokens are typically compliant with international standard ISO7816.

Personal tokens have been proposed which include communication software implementing TCP/IP protocol. IP and TCP are well-known. IP defines the format of the packets to be exchanged over the internet, as well as the way to indicate the addresses for such packets before dropping them onto the internet.

TCP adds the ability for the network to process the packets, in particular TCP defines the way the packets are transmitted while delivering them in compliance with the expected order to the destinary end-point.

IP is focused on packet addressing and routing while TCP brings transmission reliability. TCP/IP is about an association between a postman and an accountant. The accountant checks that every packet sent has been received and acknowledged. SIM cards have been proposed which are able to behave like a IP end-node, i.e. SIM cards which store and appear on the internet with an IP address so as to implement internet services.

Other cards include a web browser so as to implement bidirectional communication with a remote other end-point.

Some SIM cards have in particular been proposed which store and make available on the internet a personal blog, i.e. a web server with personal information such as way of life, and day-to-day personal information.

Despite the benefits of such a scheme, it appears that developments relating to a card on the Web tend to use the card as an additional system which is dedicated to authentication, and as such which should continue to remain in its usual role of simple exchanges with a hosting device (handset, PC) for simple authentication purposes and this appears to reduce the potentialities of the card, either for authentication purposes or more generally for service purposes such as user applications.

In such respect it is a main purpose of the invention to provide a personal token such as an IC card that is enhanced as to service capabilities. Telecommunications are becoming key elements of our lives. The explosion of the traffic is reflecting the popularity of mobile communications and dsl based broadband access to the Internet has now become a mature and widespread technology.

However, in this increasingly connected world, the complexity of the services proposed to the subscriber keeps on growing, reducing in consequence the satisfaction of the end user. Today, different networks are dedicated to different services. Boundaries within service providers are restricting services availability on different device platforms without caring about the overall consistency of the user experience.

But users do not want to live in a world of unconnected communication islands. Nor they want to worry about technical details like the access technology; they are only interested in the offered services, their quality and costs. They are expecting cheap telephony, multimedia services, security, and a personalized environment accessible with a uniform interface from all of their connection devices such as mobile handset, game station, laptops, desktops, set top boxes.

SUMMARY

The present invention aims as a main purpose to help provide such possibilities to the end-users.

These purposes are achieved by way of the invention as recited in the appended claims.

BRIEF DESCRIPTION OF THE DRAWINGS

Other purposes, benefits and aspects of the invention will appear through the following description, which is made in reference to the appended figures, among which.

DETAILED DESCRIPTION

The card according to the presently described embodiment presents a dual interface ISO/USB. This dual interface enables the use of the card in multiple devices configuration:

In particular the present card can be used in the following device configurations.

As a SIM or USIM card in a conventional handset. In this case the card is accessed using the the ISO interface.

As a SIM or USIM card in a USB enabled handset. The card is then accessed from the USB interface.

Packaged as a USB plug the card can be inserted in the USB slot of a PC. The versatility of the USB interface makes then possible for the card to appear as a composite device, enabling the implementation of various use cases as described below.

The card also features a large memory storage capacity from 64 up to 1 GB which can be partitioned as required and appear as A publicly available storage area for user applications and data pretty much like a standard memory card, or as a secure memory area only available to secure applications executed by the card processor.

The card includes a native TCP/IP stack enabling the execution of TCP/IP applications by the card processor. The network connectivity path will depend on the interface used to access the card.

When the card is accessed via the USB interface (either in a handset or as a USB plug in a PC) TCP/IP packets transit via the USB interface.

When the card is located inside a handset and accessed via the ISO interface, The BIP communication protocol described in 3GPP TS 131.11 is used as a transmission channel for IP connectivity.

The card equipped plug looks pretty much like a standard USB memory key. However, when plugged in the USB interface of a PC (Under Windows 2000 or XP), the card USB plug does not appears simply as a mass storage device, but rather as a composite USB device composed of 3 devices:

A first appearing device is the network card device, providing a communication channel for the card applications embedded in the token, enabling the token to be seen from the outside world as an IP node with its own IP address and enable the reception and transmission of IP packets from/to TCP/IP applications running in the card The second appearing device is a mass storage device, with "autorun" capability (i.e the possibility to execute selected applications automatically upon insertion of the plug in the USB slot). The mass storage area is used to store PC applications, settings or user data. It makes the card a suitable device to insure the portability of the user applicative environment.

The third appearing device is a smart card device, enabling the card to be used as a conventional smart card hosting smart card applications accessed from the host using APDU's. One important such application is the ISIM application used to authenticate the user in IMS (Instant Messaging Session) networks and secure their SIP connection.

The enumeration of the 3 different devices and installation of the corresponding drivers is done automatically, without requiring user involvement in any software installation operation.

The allocation of IP address to the card network interface can take place using 2 distinct modes: Nat mode and bridge mode.

In NAT mode the card network interface is allocated a private IP address, typically assigned by a local dhcp server, executed locally either by the PC or by the card processor.

In NAT mode, the card and the main PC network interface are most likely in different subnets.

In this mode a NAT gateway is required in order to perform the Network address translation operation on the packets transiting through the card network interface. The Nat gateway is automatically executed from the plug upon insertion.

In bridge mode the card network interface is bridged to the default PC network interface (the interface connected to the Internet). The card interface will typically obtain an IP address from a nearby DHCP server request. In bridge mode, the PC default interface IP address and the card Interface IP address are typically in the same subnet and there is not need to perform network address translation The use of private IP address in NAT is totally transparent from the network perspective in the sense that the NAT mechanism is hiding the fact that 2 devices (the card and the PC) are sharing the same IP address. It will be the preferred solution if IP addresses are scarce and the allocation of 2 distinct IP addresses (one for the PC and one for the card) from the local network is not possible.

If this is not the case, the bridge mode may be preferable.

The card can be used in a conventional handset as a USIM card. In this case the card is accessed via the ISO interface.

In order to leverage the features of the card and in particular, the network connectivity, the handset should support the Bearer independent Protocol. When this is the case, the card is able to gain network access using the BIP proactive commands.

The card, as a smart card connected to a host device is a perfect solution to authenticate users in IMS networks and secure IMS (i.e. Instant Messaging Session) applications. To that end, two levels of involvement of the card should be distinguished.

One of them is well known and corresponds to the card securing an IMS session between an application in the PC and a remote application. IMS being based on SIP signaling protocol, the PC executes an application which constitute an end-point in the SIP signaling protocol.

Therefore, the first level is the card as an ISIM card to secure IMS applications executed by the host device.

The second level is the card as a full fledge ISM node, i.e. the card executes itself an application which appears as an end-point in the SIP signaling protocol. The card is SIP enabled and here exposes Authentication services with the application of securing web access from the PC platform.

As concerns the first level of involvement of the present card, the ISIM card as specified by the 3GPP secures access to the IMS, enabling mutual authentication between the subscriber and the system as well as the protection of the SIP signaling information.

Network transformation and services convergence are essential to fulfill this demand and enhance the user experience. The IMS architecture has been designed precisely to answer those needs and provide network independent access to services.

Advances in terminal and network available bandwidth are creating opportunities for mobile operators to offer new innovative data services to users.

The Instant Messaging Session (IMS) architecture is supporting them in that approach, promising voice and data convergence over an all IP based infrastructure and enabling user-to-user communication services such as POC, video telephony, and push services.

Instant Messaging (IMS) foundation lies on a key protocol: SIP. The SIP—Session Initiation Protocol—allows different sessions to be established over any IP network or combination of networks, thereby giving the perception that there is a single network.

IMS uses SIP (Session initiation protocol) protocol defined by the IETF for application session management.

SIP and IMS enable the creation of converged, unified communication domains using any fixed or mobile packet access network.

The SIP—Session Initiation Protocol—was originally defined by IETF and then adopted for mobile networks by 3GPP and 3GPP2.

SIP signaling protocol is mainly known as one of the signaling protocols allowing conferencing over the internet.

SIP is known as mainly intended for initiating a session involving video, voice, instant messaging, online games, or virtual reality. SIP is one of the leading signaling protocols for voice over IP, with H323 as another example.

The main functions of a signaling protocol are to locate an end-point, to contact an end-point so as to determine whether the end-point intends to establish a session, exchange information about the different end-points abilities and their associated hardware, to modify existing sessions, and to close an existing session.

The SIP protocol makes use of a server/client architecture and implements textual messages. The SIP messages are typically transported under the TCP protocol as in the present embodiment.

According to another embodiment, SIP messages can also be transported by UDP messages. But as compared to TCP/IP, UDP protocol does not insure transmission reliability.

A SIP message includes a header and a body. The header includes the necessary parameters for routing the message and establishing the session. The body describes the details of the session to be initiated.

SIP defines user-agents, which have SIP addresses. These are the terminal nodes in the SIP protocol. A user-agent may be the application software of the end-user. A user-agent may typically be a Voice-over-IP application, but it can also be a visio-conferencing application or a real-time messaging application. The purpose of SIP is to establish sessions between such typical user-agents.

In order to initiate a session with a remote user-agent under SIP protocol, it is necessary to locate the user-agent, i.e. to know the SIP address of such remote user-agent. A server in the SIP architecture makes a correspondence between IP addresses and SIP addresses of the registered user-agents. A user-agent can change IP address, i.e. an application be transferred from one hardware equipment to another hardware equipment, the change of IP address associated with such user-agent simply has to be registered in this SIP server.

Once the remote user-agent located, a SIP dialog allows to exchange data between two user-agents, or between a user-agent and a server, which exchanged data include IP addresses of the two user-agents, data about the respective ports, and data about coding formats which are to be used. The two user-agents then can benefit from the initiated session.

In the frame of the above cited first level of involvement of the present card, i.e. the card as an ISIM card to secure IMS applications executed by the host device, the ISIM authentication application specified by the 3GPP is embedded in the card and secures IMS applications running on the host device. The 3GPP recommendation TS131.203 describes the mutual authentication mechanisms between the subscriber and the IMS system, resulting in the protection of the SIP signaling information. In this scheme, the IMS application communicates with the ISIM application on the card using the ISIM commands.

Figure 1:
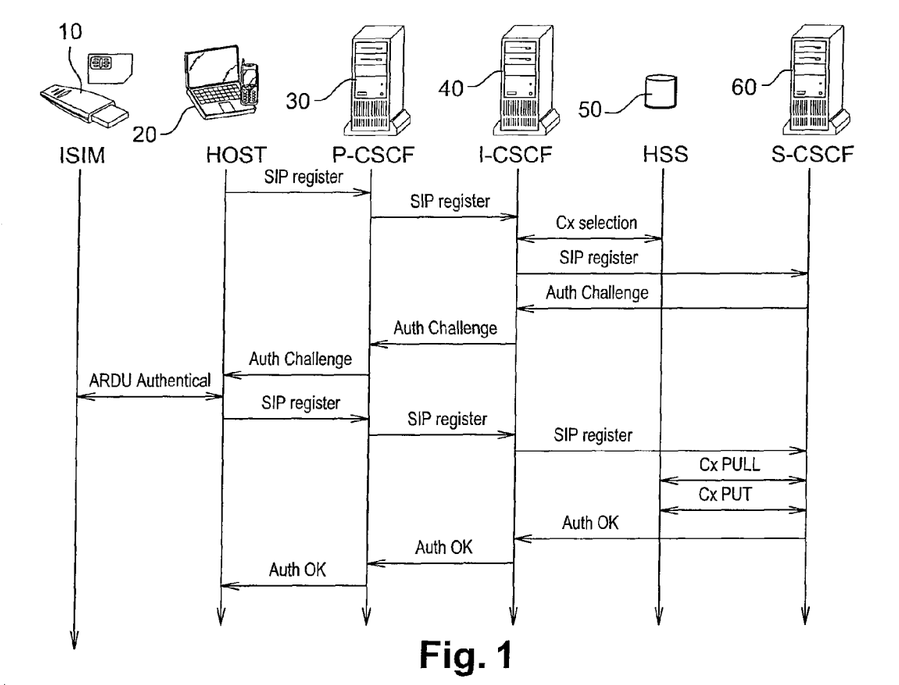
FIG. 1 shows a sequence of messages exchanged during a IMS (Instant Messaging Session) authentication session in an ISIM authentication implemented by a card according to the invention.

This is illustrated on FIG. 1 which shows the sequence of messages exchanged during a IMS authentication session. It can bee seen on this figure that the SIP message termination point is the host computer.

FIG. 1 represents the card 10, the PC under reference 20. FIG. 1 depicts also a P-CSCF 30, an I-CSCF 40, a HSS 50, and a S-CSCF 60 which are the usual constituent of an IMS architecture.

In this configuration, the application of the host 20 communicates with the ISIM application of the card 10 by means of APDU commands.

To illustrate the functioning principles of the card to secure the host IMS application, we will detail how the card hosted in the plug can be used to secure a VOIP application 15 running on a laptop PC. The architecture and workflow used to deploy this application are sketched on FIG. 2.

Figure 2:
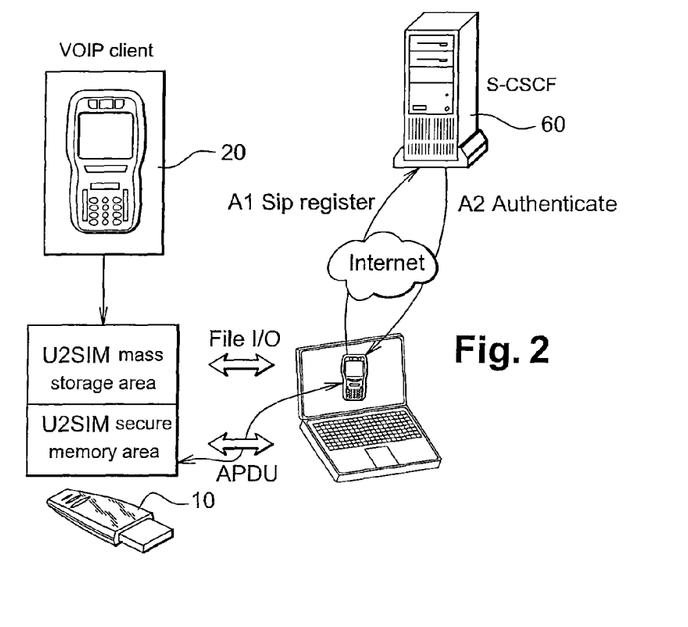
FIG. 2 is a diagram which illustrates how a card according to an embodiment of the invention can be used for securing a Voice-over-IP application running on a Personal Computer.

The VOIP application 15, a PC application, corresponds to an executable file stored in the publicly available mass storage area of the token and later run by the PC.

At step A1, the VOIP application 15 sends a SIP REGISTER command to the S-CSCF server 60 (via the P-CSCF and the I-CSCF intermediate nodes). At step A2, the S-CSCF 60 responds with an SIP message carrying an authentication request. The Authentication challenge is transported via the SIP protocol. In order to answer the challenge, the VOIP client 20 will communicate with the card 10 by means of the ISIM APDUs and channel them through the smart card device interface of the card.

Once the authentication is successfully completed, the VOIP application 15 will be registered with the Sip server 60 and the subsequent SIP messages will be secured.

Secure SIP messages will prevent attacks based upon the hacking of SIP messages, a technique commonly used for example in the usurpation of a user identity (calling someone with caller id of someone else).

The IP connectivity features of the card make also possible for the card to appear as a full fledge IMS node in order to secure IMS applications running on the card itself. This is the second level of involvement of the present embodiment of the invention as announced before in the description.

For this, the card processor executes a SIP user agent.

Figure 3:
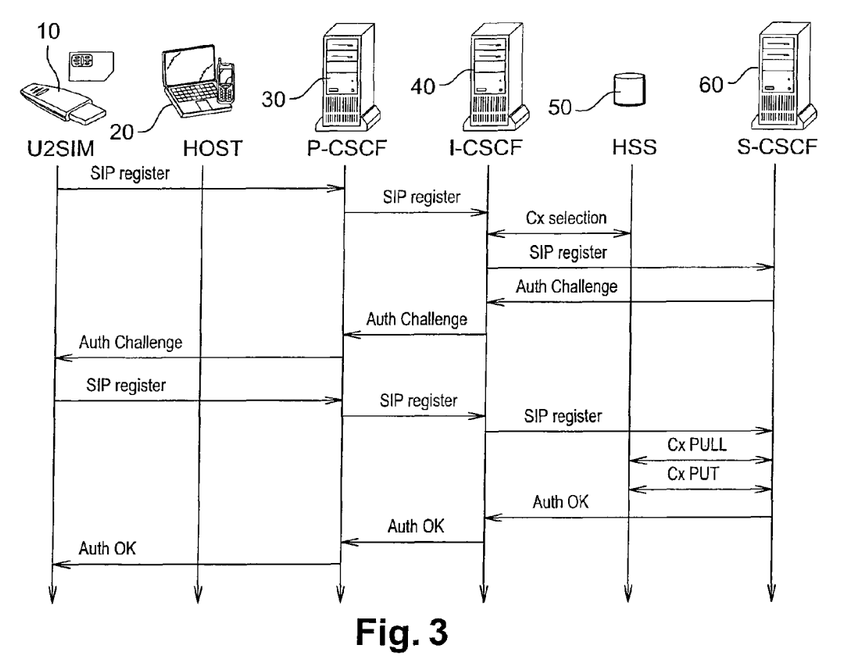
FIG. 3 shows a sequence of messages exchanged during a IMS authentication session when a card according to an embodiment of the invention appears as a full fledge IMS node in order to secure IMS applications running on the card itself

FIG. 3 illustrates the sequence of messages exchanged during an IMS authentication session in this configuration. The IP packets carrying the SIP information transit through the host 20 to and from the card 10 that takes care of the generation of the SIP messages carrying the authentication challenge response In a conventional approach a smart card is usually connected to a host device and the interaction between the card 10 and the host device 20 is typically done through the exchange of APDUs.

In this model the coupling between the host computer and the smart card is strong, and an application on the card cannot be accessed without some kind of interfacing software layer running on the host computer.

An IP enabled smart card however appears as a node on the network. The invocation of services located on this card becomes possible, once the IP address of the card is known.

The use of the SIP protocol allows to locate the smart card device in order to establish a working session with the services located on it.

The smart card is not tied any more to a particular type of device and can be moved freely from one device to another.

The present embodiment has been described on the basis of SIP on TCP/IP messages. However, in an other embodiment, SIP can also be implemented on the basis of other types of messages, such as UDP messages as another example.

We will illustrate this concept via the description of 3 sample applications: in a first application, the card constitutes a network authentication device to secure web access. In a second application, Remote administration of the card will be described. In the third application, the card constitutes a secure storage device for the subscriber digital rights.

In the scheme where the card acts as an authentication device to secure web access, the enhanced connectivity provided by the Internet leads us to establish a growing number of business relationships requiring end user authentication which is often based on the use of passwords with well known associated problems (weak passwords, difficulty to remember multiple different passwords . . . )

On the other hand, the fear for piracy (virus, spyware, pshishing) is today more present than ever spurring a renewed interest for alternative authentication methods to secure access to the World Wide Web.

Authentication with smart cards, introducing a second authentication factor offers an attractive alternative to the use of usernames and password, combining robustness and simplicity of operation.

The Single Sign On architecture model proposed by the liberty Alliance relies on the services offered by an identity provider to authenticate the user.

Figure 4:
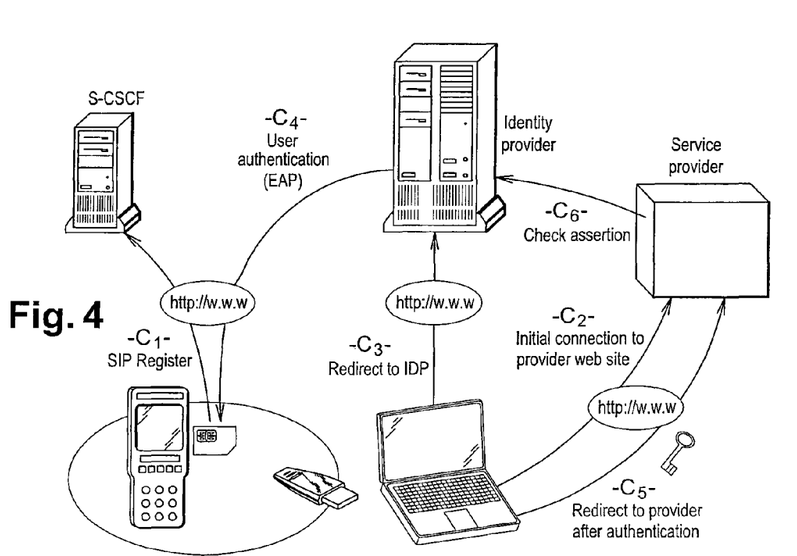
FIG. 4 illustrates a sequence of operations involved in a user authentication when using a card according to the described embodiment of the invention.

FIG. 4 describes the sequence of operations involved in a user authentication operation with the help of the card when using this Single Sign On architecture.

The purpose of the application is to authenticate securely a web user connecting to a provider web site The authentication is performed by invoking the services of an authentication application running on the user card.

The card can be physically located in the user handset (USIM card), or plugged as a USB dongle in the user PC. In either case, the case, the card will perform a SIP registration operation when being powered on.

During this registration, the Subscriber and the IMS network will mutually authenticate. At this point, the card is ready to answer service requests.

The authentication operation of the subscriber accessing the provider web site is itself taking place in 4 distinct steps labeled from C2 to C5 on FIG. 4. (Step C1 being the SIP registration itself) and which can be described as follows.

At step C2, the user points his browser to the service provider web site and enters his public identity (federated identity provider by the identity provider).

At step C3, His browser is automatically redirected to the Identity provider authentication page providing feedback indicating that an authentication is about to take place.

At step C4, The identity provider Authentication application uses the SIP protocol to locate the card of the subscriber and invoke the services of the authentication application. The card and the Identity provider authentication server exchange authentication messages.

At step C5, i.e. at the end of the authentication, the user web browser is redirected to the web side of the service provider. The Redirect Request carries an "authentication Assertion" transmitted by the identity provider.

At step C6, The service provider will check the validity of the assertion with the identity provider before granting the user access the resources of the web site.

The authentication scheme is independent from the physical location of the card and the device to which it is connected.

As a matter of fact, the user could very well remove the The card from the handset and plug it in the USB port of his PC. Authentication Messages will reach automatically the card located in the PC.

One could also contemplate the possible simultaneous use of 2 distinct authentication devices: One USB token, and the USIM card of the handset. The access strategy can then be defined at the level of the SIP registrar. It can be possible to forward connection requests to both devices simultaneously as this happens when calling a skype user simultaneously on 2 computers.

The operator can also define forwarding priorities and give the priority to one device rather than the other. The user can for example be authenticated with his USB token when it is plugged into the PC, and with the card located in his handset when the token is not connected.

In the scheme consisting in remote administration of the card, it should first be reminded that operators routinely manage the SIM and USIM cards of their subscribers using OTA management techniques, based on the 03.48 3GPP specifications.

Unfortunately SIM card management operations are still very often executed via the slow and non real time SMS channel. The Bearer Independent Protocol (BIP) is supposed to enable high-speed communication with the SIM and has been standardized long time ago by ETSI. But until recently handset manufacturers have been poorly supported this protocol However, if OTA techniques are perfectly defined for SIM/USIM cards inserted in handset, such administration is ill defined for a USB token with card inside.

The SIP enabled card brings an elegant solution to this problem, by opening the way to an IP based administration of the card presenting the following advantages.

Pure IP architecture leads to a reduction in cost and complexity of the remote administration solution.

Uniform administration mechanisms are executed whatever the device hosting the card. A card hosted in a Handset will be managed the same way as a card packaged as a PC USB dongle inserted in a PC Reliance of well established and widely used IP security protocols and architectures such as PKI is obtained.

Improved delegation mechanism is achieved. Using the PKI and certificate signing mechanism, the operator can very easily grants a provider administrative access for his service on the consumer card. In the scheme where the card appears as a secure storage for the subscriber digital rights, it should first be reminded that mobile operators are seeking to generate increased revenues from content services in order to compensate for falling voice revenues and justify high expenditure on 3G licenses and infrastructure. Providing high-value content services such as full-track music services is advantageous in this regard but without adequate content protection in place, such services are hardly workable.

On the other hand, the adoption of DRM schemes will depend heavily on the flexibility of the DRM systems which should be compatible with the user content usage expectations i.e. act independently of individual formats and playback software or devices, and support the portability of media contents from device to device and the need to access this content from distinct heterogeneous platforms.

The card can be used as a network accessible secure repository for DRM licenses, enabling multidevice access to protected content and supporting the implementation of new innovative peer to peer media distribution schemes such as the superdistribution relying upon media consumers to redistribute content.

The described card can be therefore be used as an IMS security device in two distinct possible ways. It can host the ISIM application to secure IMS applications running on the host device. It is SIP enabled and becomes when requested a full node on the IMS network, exposing security related services as card based IMS applications, making possible the invocation of those services from several distinct user devices at the same time. The card is also enabled for an IP based remote management of the Card independently on the card-hosting computer. IP based remote administration of the card applications is enabled, but also remote administration of data of the card, independently of the device hosting the card.

Making use here of native IP connectivity the invention opens new perspectives in the world of IMS applications, making possible the secure hosting of many SIP enabled IMS applications exposed in the same way as the here described security service accessible throughout the Internet.

Doing so, the invention makes personal tokens evolve from a simple IMS authentication device to a full fledge device hosting IMS applications.

Figure 5:
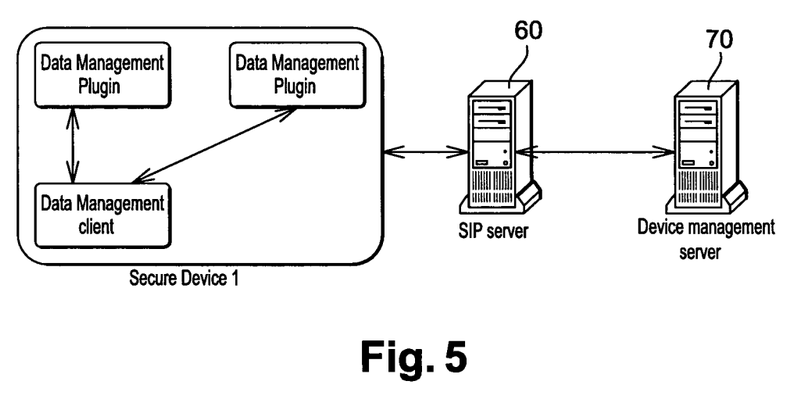
FIG. 5 represents a secure personal token remote management architecture according to the invention.

In a preferred embodiment, the invention allows remote management of a secure personal token as depicted on FIG. 5.

Operators routinely manage the SIM and USIM cards of their subscribers using OTA management techniques based on the 03.48 3GPP specifications. However, if OTA techniques are perfectly defined for SIM/USIM cards inserted in handset, such administration is tightly linked to the GSM network and cannot be readily applied to manage a secure device with different form factors and different access channels such as an USB token.

The SIP enabled secure device brings an elegant solution to this problem, by opening the way to an IP based administration of the card presenting the following advantages. Pure IP architecture is used leading to a reduction in cost and complexity of the remote administration solution. Uniform administration mechanisms are realised thanks to the invention whatever the host hosting the secure device. A card hosted in a Handset will be managed the same way as a card packaged as a PC USB dongle inserted in a PC. A higher reliance is obtained upon well established and widely used IP security protocols and architectures to secure the administration procedures.

The architecture of a secure device management solution is described on FIG. 5.

The purpose of a device management system is to keep track of the devices configuration and to generate configuration commands to be interpreted by the data management client and describing the management operations to be performed. A preferred device management server 70 is an OMA-DM server. In this case the semantic of the management operations to be performed is described using the OMA-DM XML format. The XML data generated by, the OMA-DM server 70 is transmitted to the SIP server 60 where it is encapsulated into SIP messages of type "MESSAGE" to be sent to the secure personal token 10.

The device management client running inside the secure personal token 10 receives the SIP messages. The OMA-DM XML data is retrieved from the SIP message and interpreted.

The device management functions themselves are implemented by means of data management plugins, each plugin being responsible to manage a particular aspect of the device (for example application management on the device may be implemented using a plugin).

The concept of plugin insures the modularity of the device management solutions. Plugins themselves can be managed via the device management server 70. This means that the device management functionality can be expanded dynamically as required.

The invention claimed is:

1. A personal token comprising:
a microprocessor and a memory,
said personal token storing and running a software entity which constitutes an end-point for communication over the internet,
wherein the software entity is a network node comprising an end-point address, wherein the software entity is configured to receive a first data packet from a remote entity and transmit a second data packet to the remote entity via a network using the end-point address according to a signaling protocol which is of a type intended at initiating a session allowing real-time conferencing over the internet,
wherein the personal token supports a universal serial bus (USB) interface and an ISO interface, and wherein, when accessed via the USB interface, the personal token is a composite device comprising a mass storage device, a network card device, and a smart card device, and
wherein said personal token includes a service software entity which exchanges data with the remote entity inside the session as initiated by said signaling protocol.

2. The personal token of claim 1, wherein the signaling protocol is Session Initiation protocol (SIP).

3. The personal token of claim 1, wherein said personal token stores in said memory of the personal token the end-point address according to the signaling protocol.

4. The personal token of claim 3, wherein the stored end-point address is a SIP address.

5. The personal token of claim 1, wherein said personal token stores and runs an authentication software entity which prepares a response to an externally originating authentication challenge, wherein the authentication software entity sends said response inside the session as initiated according to said signaling protocol.

6. The personal token of claim 5, wherein the signaling protocol supports multiple authentication challenges to be responded by the personal token inside a same session, which multiple authentication challenges originate from different entities over the internet.

7. The personal token of claim 1, wherein said personal token constitutes a subscriber identification module in a mobile telephony network.

8. A mass storage device storing a software entity for a personal token:
the software entity configured to constitute an end-point for communication over the internet,
wherein the software entity is a network node comprising an end-point address, wherein the software entity is configured to receive a first data packet from a remote entity and transmit a second data packet to the remote entity via a network using the end-point address according to a signaling protocol which is of a type intended at initiating a session allowing real-time conferencing over the internet, and
a service software entity which exchanges data with the remote entity inside the session as initiated by said signaling protocol,
wherein the personal token supports a universal serial bus (USB) interface and an ISO interface, and wherein, when accessed via the USB interface, the personal token is a composite device comprising the mass storage device, a network card device, and a smart card device.

9. A communicating method between a personal token comprising a microprocessor and a memory, said personal token storing and running a software entity which constitutes an end-point for communication over the internet and a remote entity over the IP network, wherein the software entity is a network node comprising an end-point address, wherein the software entity is configured to receive a first data packet from a remote entity and transmit a second data packet to the remote entity via a network using the end-point address according to a signaling protocol which is of a type intended at initiating a session allowing real-time conferencing over the internet, wherein the personal token supports a universal serial bus (USB) interface and an ISO interface, wherein, when accessed via the USB interface, the personal token is a composite device comprising a mass storage device, a network card device, and a smart card device, and wherein said personal token includes a service software entity which exchanges data with the remote entity inside the session as initiated by said signaling protocol.

10. The communicating method of claim 9, wherein the method comprises an updating step of software on the personal token by the said remote entity.

* * * * *

UNITED STATES PATENT AND TRADEMARK OFFICE
CERTIFICATE OF CORRECTION

| | | |
|---|---|---|
| PATENT NO. | : 8,484,712 B2 | Page 1 of 3 |
| APPLICATION NO. | : 12/303656 | |
| DATED | : July 9, 2013 | |
| INVENTOR(S) | : Herve Ganem | |

It is certified that error appears in the above-identified patent and that said Letters Patent is hereby corrected as shown below:

Delete title page and substitute therefore with the attached title page consisting of corrected illustrative figure.

In the Drawings

Figure 1, is comprising of "ARDU" exchange and should be -- APDU -- as shown on the attached Replacement Sheet.

Signed and Sealed this
Twenty-fifth Day of March, 2014

Michelle K. Lee
*Deputy Director of the United States Patent and Trademark Office*

United States Patent
Ganem (12) 
(10) Patent No.: US 8,484,712 B2
(45) Date of Patent: Jul. 9, 2013

(54) PERSONAL TOKEN HAVING ENHANCED SIGNALING ABILITIES

(75) Inventor: Herve Ganem, Meudon (FR)

(73) Assignee: Gemalto SA, Meudon Cedex (FR)

( * ) Notice: Subject to any disclaimer, the term of this patent is extended or adjusted under 35 U.S.C. 154(b) by 307 days.

(21) Appl. No.: 12/303,656

(22) PCT Filed: Jun. 8, 2007

(86) PCT No.: PCT/IB2007/001556
§ 371 (c)(1),
(2), (4) Date: Dec. 15, 2010

(87) PCT Pub. No.: WO2007/144737
PCT Pub. Date: Dec. 21, 2007

(65) Prior Publication Data
US 2011/0113479 A1 May 12, 2011

(30) Foreign Application Priority Data
Jun. 9, 2006 (EP) .................... 06300575
Sep. 20, 2006 (EP) .................... 06291477

(51) Int. Cl.
*H04L 29/06* (2006.01)
*G06F 15/16* (2006.01)

(52) U.S. Cl.
USPC ............ 726/9; 726/14; 709/217; 709/227

(58) Field of Classification Search
None
See application file for complete search history.

(56) References Cited

U.S. PATENT DOCUMENTS

| | | | | |
|---|---|---|---|---|
| 6,151,619 | A * | 11/2000 | Riddle | 709/204 |
| 6,250,557 | B1 * | 6/2001 | Forslund et al. | 235/492 |
| 7,246,236 | B2 * | 7/2007 | Stirbu | 713/168 |
| 7,428,606 | B2 * | 9/2008 | Liu et al. | 710/62 |
| 7,454,233 | B2 * | 11/2008 | Lu et al. | 455/558 |
| 7,545,868 | B2 * | 6/2009 | Kennedy et al. | 375/259 |
| 7,609,700 | B1 * | 10/2009 | Ying et al. | 370/395.21 |
| 7,647,493 | B2 * | 1/2010 | Bajko et al. | 713/152 |
| 7,669,773 | B2 * | 3/2010 | Nishizawa et al. | 235/492 |
| 7,877,787 | B2 * | 1/2011 | Laitinen et al. | 726/4 |
| 7,922,091 | B2 * | 4/2011 | Deprun et al. | 235/492 |

(Continued)

FOREIGN PATENT DOCUMENTS

| | | |
|---|---|---|
| EP | 1 610 521 A1 | 12/2005 |
| WO | 2004/054302 A | 6/2004 |

(Continued)

OTHER PUBLICATIONS

"USB/IP—a Peripheral Bus Extension for Device Sharing over IP Network", Takahiro Hirofuchi, Eiji Kawai, Kazutoshi Fujikawa, Hideki Sunahara, Nara Institute of Science and Technology, Ikoma, Japan, Freenix Track: 2005 USENIX Annual Technical Conference.*

(Continued)

*Primary Examiner* — Christopher Revak
(74) *Attorney, Agent, or Firm* — Osha • Liang LLP (57) ABSTRACT

The invention relates to a personal token including a microprocessor and a memory, said personal token storing and running a software entity which constitutes an end-point for communication over the internet. The software entity constitutes an end-point according to a signaling protocol over the internet and the signaling protocol is of the type intended when the session for real-time conferencing is initiated between end-points.

10 Claims, 3 Drawing Sheets

Fig. 1

Fig. 2